United States Patent [19]

Lambert, Jr.

[11] Patent Number: 5,316,232
[45] Date of Patent: May 31, 1994

[54] OMNIDIRECTIONAL WIRE DISPENSER

[76] Inventor: John A. Lambert, Jr., 211 Shelly La., Montgomery, Ala. 36110

[21] Appl. No.: 975,739

[22] Filed: Nov. 13, 1992

[51] Int. Cl.⁵ .............................................. B65H 16/00
[52] U.S. Cl. .............................. 242/86.50 R; 242/129
[58] Field of Search ................. 242/86.5 R, 129, 129.7

[56] References Cited

U.S. PATENT DOCUMENTS

| | | | |
|---|---|---|---|
| 3,072,357 | 1/1963 | Sprague et al. | 242/86.5 R |
| 3,693,806 | 9/1972 | Lit et al. | 242/55.2 X |
| 3,831,877 | 8/1974 | Bennett et al. | 242/86.5 R |
| 4,564,152 | 1/1986 | Herriage | 242/86.5 R |

OTHER PUBLICATIONS

Greenlee Textron Inc., catalog copyright Aug. 1989, pp. 85, 86.

Primary Examiner—Daniel P. Stodola
Assistant Examiner—Eileen A. Dunn

[57] ABSTRACT

A tangle-free wire dispenser for transporting and simultaneously dispensing single and multiple wires in any direction. The wire dispenser comprises of a boxlike outer frame, with wheeled legs, a parallel inner shaft, with perpendicular spool holders thereon, and spool tension bars. The top outer frame contains individual wire guide windows, which permit omnidirectional dispensing of wire, and wires, from spool holders without repositioning the dispenser. The inner shaft comprises an extendable transport handle inserted within its long axis, wherein the spool holders and tension bars are mounted and divided at right angles. Individual spool holders permit changing, replenishing, and tensioning of selected spools without interruption of other spool operations The inner shaft, spool holders, and tension bars comprise an integral supplier of tensioned wire to individually interface spools with the respective guide windows, thus isolating each spool during multispool and multidirectional wire use, eliminating backlash and tangle. The legs, which have at least two removable wheels for specific operational requirements, are attached at the bottom of the outer frame. The wheels conjuncted with the outer frame, its inner components, and an extended handle comprise an integral wire dispensing cart.

2 Claims, 2 Drawing Sheets

OMNIDIRECTIONAL WIRE DISPENSER

BACKGROUND OF THE INVENTION

This invention relates, in general, to portable devices used for the transporting and dispensing of spooled metal electrical wire. Specifically herein, this device stores, protects, transports, and despools wound wire, and respools excess free wire. However, it is envisioned that other spooled materials, such as rope, ribbon, and nonconductive wire may also be dispensed by use of this device. Such Materials may be dispensed, singularly and multiplely, in any direction.

The wire to which this device pretains is generally small sized, such as 18 through 6 gauge. Such wire is manufactured and wound onto spools, which may vary in diameter and width of the spool, depending on the amount of wire placed on the spools. Said spools are provided with a hollow hub, which may also vary in diameter and width.

In the field of electrical wiring, it is necessary to devise a means of simultaneously dispensing several spools of wire. However, present devices use a single horizontal spindle, either handheld or fastened to a framework. This allows the spools to rotate when the free end of the wire is pulled. Some devices have slots which help guide, and in some cases add friction to, the wire. Due to the resiliency of spooled wire, the wire tends to override the spool rim, entangling with the device and the adjacant spools. Thus causing either damage to the wire or loss of productivity, or both, when correcting. Severely bent, and nicked, electical wire results in a critical reduction in its conductive properties. Since much electrical wire has opaque outer insulation the damage to wire may not be visually detectable. Therefore, wire may be unknowingly installed in an unsafe condition.

In some present devices, spools are mounted side by side on a single holding rod. This arrangement creates several problems, when a spool becomes depleted. Excepting outer spools, the said arrangement requires that additional spools be removed to replace the depleted spool. The same problem is inherent in replacing one gauge of spooled wire with a different gauged wire, when satisifying job requirements. Furthermore, excess unspooled wire must be respooled prior to transportation. Excess wire is subject to physical damages and is a safety hazard when left loose within the workplace. With spools mounted side by side, on a single holding rod, the process of respooling is cumbersome and ineffective. To respool effectively, the spool must be removed from the dispensing device. Otherwise, when despooling and respooling the inertia from one spool is transmitted to adjacent spools by physical contact.

A means of pretensioning each wire, before it leaves the spool is essential. In the process of dispensing, wire tends to retain the circular shape of the spool, and tends to remain in the motion, indirection of spool rotation. Thereby, wire tends to backlash within the spool when rotation is slowed. This event is common and similar to the frequent backlash of fishing line on bait casting fishing reels. Current devices do not negate backlash, because the wire is tensioned after the wire departs the spool. In a like manner, another problem occurs when spools are mounted on a single rod. When one, or more, wires are pulled, static spools bind with rotating spools, creating backlash within the static spool. Conversely, rotating spools are subjected to undesirable and excessive resistance when wire is pulled.

With current devices, the user is limited to where they may locate when dispensing wire. Said devices are also limited to a person, or persons, continually pulling wire in generally the same direction. However, it is the general nature of commercial, residential, and industrial wiring tasks, and in servicing multiple pieces of equipment, that multiple wires be pulled in multiple directions. Since present dispensing devices do not conform to the nature of the tasks, much time is expended in repositioning the device to a correct angle, and often location, to permit wire pulling. When a dispensing device must, otherwise, be relocated a mechanically assisted means of transport is essential. Whereas, the aggregate weight of several spools of wire will often exceed the body weight of the individual worker. The device described, herein, comprises a means of both saving labor and limiting the deficiencies of other existing devices.

SUMMARY OF THE INVENTION

It is an objective of the Tangle-free Wire Dispensing Cart to provide a means transporting, protecting, dispensing spooled metallic wire. Said objective includes both omnidirectional and simultaneous dispensing and respooling of wire, and wires, on a plurality of physically separated spools.

To accomplish the stated objective, this invention comprises of a device having an outer frame and an inner shaft. The outer frame provides a housing to protect wire and mounts the inner shaft. The top of said frame, having omnidirectional wire guide windows, positioned over each spool of wire. The windows function as a means of keeping individual, pretensioned wires separate during dispensing and rewinding. Thus, having individual guide windows, this device can be concurrently utilized by more than one person. The rear of the outer frame is wheeled to mechanically assist transportation of the entire device. Such wheels are removable when stationary operation is required. The opposite end of this device rest on the ground, or other such surface, providing stabilization of the entire device.

Toward the objectives of this invention, the inner shaft provides a means of mounting spool holders, tension bars, and an elongated retractable handle. The desired number of spool holders are mounted atop the inner shaft. Such serve as spindels to be inserted through the hollow hub of wire spools. Rigid spring clips are inserted, to retain the spools, through apertures in the outer end of each spool holder. Sleeves of various outer diameter may be inserted, as required, over the length of the spool holder to provide adjustment to different sized spool hubs. Such sleeves are retained by the same clip which retains the spools onto the spool holder.

It is an objective of this invention to provide adjustable tensioning bars, which are mounted onto the bottom of the inner shaft. One, or more, tension bars contact the outer edge of each spool flange. By constantly maintaining tension, the tension bars both retain the wire within its spool and provides a means of negating backlash when the spool is rotated. The tension bars provide a means of tensioning the wire prior to the wire being pulled from its spool, hence through the corresponding wire guide window. Required adjustment of the tension bars is accomplished by means of wing nuts which secure the slotted mounting brackets, which secure the tension bar onto the inner shaft. To accomplished the implied objective of safety of this invention, the hollow inner shaft conceals the retractable handle, when not extended for transport purposes.

It is an objective of the Tangle-free Wire Dispenser to improve current means and devices related to the of tasks removing wire from its spool for utilization, regardless of the purposes of wire use. Therein to provide an integral device for dispensing, as required, multiple wires, in multiple directions, by more than one person, without having to reposition the device.

The related objectives and the advantages of this invention are graphically apparent by the following drawings and relate to the detailed description. Both the drawings and descriptions are for illustrative purposes. Neither the drawings nor the descriptions should be construed as being limited as to scale, materials, attachments, and adornments, and thereby the specific use thereof.

DESCRIPTION OF PREFERRED EMBODIMENT

Figure 1:
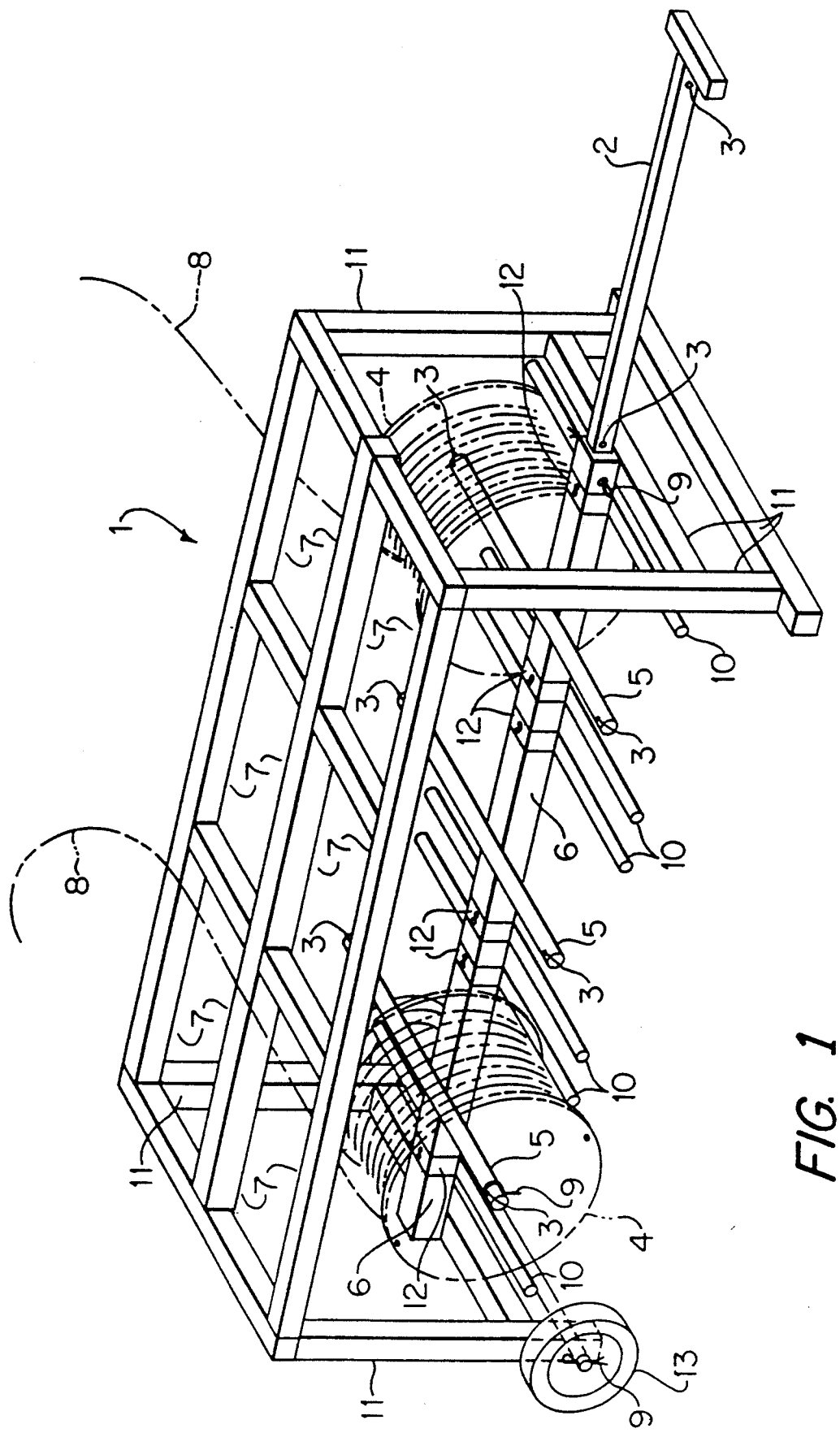
FIG. 1 is a frontal oblique perspective of the wire dispenser cart with the handle extended, and the related mounting of spooled wire within the outer frame, and wires dispensing in more than one general direction, via the guide windows.

To promote and understand the principles of this invention, reference is made to the embodiment illustrated in the drawings and specific language is used, herein, to describe the same. It is nonetheless understood that no limitations of the scope of this invention is thereby intended. Alterations, modifications, and adornments to the illustrated device, and such applications of principles of this invention are contemplated as being normal occurrences to one skilled in the related art.

In reference to the detailed drawings, there is shown in FIG. 1 an oblique view of the wire dispensing cart 1, having a handle 2 extended from within the cavity of the inner shaft 6. The handle 2 is locked into the either the extended or concealed position related to the inner shaft 6, by inserting a spring clip 9 through through clip holes 3 when aligned. With the handle 2 extended, the cart 1 provides a means of mechanically assisted locomotion on wheels 13. The wheels 13 and the inner shaft 6 are attached to the outer frame 11 having both horizontal and vertical rigid members intersecting at right angles, comprising a boxlike outer frame 11. The elongated inner shaft 6 is attached at opposite ends within the outer frame 11, in a centrally fixed position for affixing spool holders 5 and tension bars 10, intersecting, and dividing both holders 5 and bars 10 at right angles. Thereby, the inner shaft 6 is parallel the long axis of the box like outer frame 11 and the spool holders 5 and tension bars 10 are perpendicular to the long axis of the outer frame 11. The hollow hubs of manufactured spools 4 of wire 8 are inserted onto the rigid spool holders 5, on either side of the inner shaft 6. Said spools 4 are retained on said holders 5, via spring clips 9 which are inserted into clip holes 3 at each end of the spool holders 5. Thus spools 4 are physically separated by the inner shaft 6 onto the spool holders 5. Thus the spools 4 are individually mounted and isolated from one another. Wire 8 from the spools 4 is passed through interfaced wire guide windows 7 within the top of the outer frame 11. Having guide windows 7 individually interfaced with each mounted spool 4 provides a means of independent operation of each spool 4, whenever the free end of wire 8 is pulled through the window 7 for dispensing purposes. Thus, binding one on another of spools 4 is eliminated, as is the crisscrossing of wires 8 during the process of despooling and respooling, as would be if spools 4 were mounted abutting side by side, contacting with one another. Thus each spool 4 is accessible for replacement onto the spool holder 5, without interruption of operations of adjacant spools 4.

The inner shaft 6 mounts tension bars 10 in a like manner as spool holders 5. Said bars 10 being mounted onto the bottom side of the inner shaft 6 and parallel to the spools 4 and spool holders 5. Tension bars 10 provide a means of providing tension when contacting the outer rim of spools 4. One or more tension bars 10, and a corresponding tension bracket 12, provides a means of adjusting contact friction of the tension bar 10 and the various diameters of spool rims 4. The wire 8 is pretensioned prior to departing the spool 4, and thus does not backlash on the spool 4. The tension bars 10 provide a means to retain the resilient wire within the rims of the respective spool 4; thus wire 8 does not entangle with other spools 4 and other parts comprising the cart 1.

Figure 2:
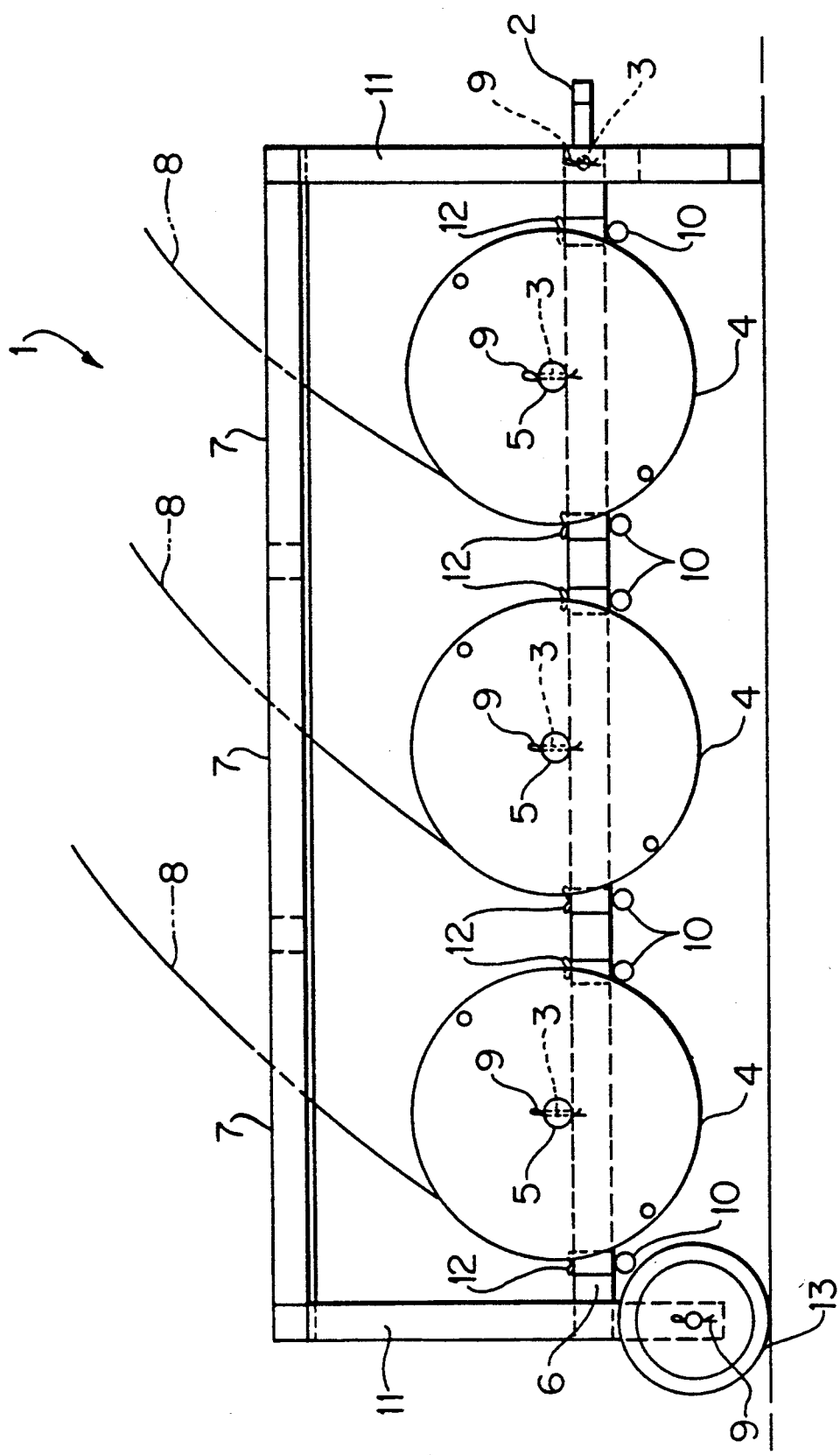
FIG. 2 is a right side perspective showing the handle retracted, spooled wire mounted within the outer frame, and multiple wires dispensing in generally a common direction.

As shown in FIG. 2, a side perspective FIG. 1 cart 1, the same embodiment with handle 2 retracted into the inner shaft 6. Said shaft 6 further comprises the outer frame 11. In that while the shaft 6 mounts, tension bars 10, spool holders 5, and hence spools 4, and hence wire 8, the inner shaft 6 also is a horizontal connector for the bottom outer frame 11. FIG. 2 illustrates of the integral operation of the tension bars 10, spool holders 5 and spools 4, as wire 8 is pulled, regardless of the number of wires 8 pulled through their corresponding guide windows 7. When the free end of any wire 8 is pulled, there results a slight lift of the wire spool 4 off of the tension bar 10. Thus reducing friction on the spool 4 rim and allowing the spool 4 to rotate more freely. When the wire 8 ceases to be pulled the spool 4 drops and rests firmly against the tension bar 10 and the spool holder 5, where as the holder 5 is not precisely matched to the diameter of the spool 4 hub. Thus friction is increased and the rotation of the spool 4 is slowed and inertia is decreased.

FIG. 2 shows the proximity of the spool holders 5 and the tension bars 10. The slightly up and down movement of the spool 4 between the holders 5 and the bars 10 pretensions the pulled wire 8 prior to departing the spool 4. Thereby, and at all times, the wire 8 remains within the spool 4 and at a consistent tension when wire 8 is dispensed. When respooling of excess dispensed wire 8 is desired, and when rapid dispensing is desired, the tension bars 10 are adjusted away from the spool 4 rim by loosening the wing nuts which retain the adjustment bracket 12 and hence the tension bar 10. By sliding the tension bar 10 along the inner shaft 6, and away from the spool 4, tension on the spool 4 is negated and the spool 4 can be operated in a freewheeling mode. The tension adjusting bracket 12 also provides both a means of locking spool 4 rotation when desired and to accommodating various sized spool 4 diameters.

While this invention has been described and illustrated in the foregoing, it is understood that other than the preferred embodiment as shown and described, all embodiments within the spirit of the principles of this invention are desired to be protected.

What is claimed is:

1. An omnidirectional wire dispenser for dispensing wire from multiple spools, which comprises a generally rectangular top frame member configured to define a plurality of guide windows, end frame members attached to said top frame member generally perpendicular thereto at first and second ends thereof, an inner shaft member attached to and extending between said first and second end frame members, a plurality of spool holders perpendicularly mounted on said inner shaft member and corresponding in number to the number of guide windows, pairs of spool tension bars corresponding to each spool holder, each said pair of spool tension bars mounted perpendicular to said inner shaft member so to be located on either side of the corresponding said spool holder, wheels mounted on one of said end frame members opposite said top frame member and a handle that is extendable from said inner shaft is mounted on the other of said end frame members.

2. The omnidirectional wire dispenser of claim 1, wherein the spool tension bars apply friction to rims of the spools of wire so to prevent said spools from continuing to rotate after the dispensation of the wire has stopped and preventing backlashing of the wire due to inertia of the free spinning spool.

* * * * *